United States Patent [19]

Taboury et al.

[11] Patent Number: 5,104,212
[45] Date of Patent: Apr. 14, 1992

[54] DIFFRACTIVE CONTACT LENS IN RELIEF

[75] Inventors: Jean Taboury, Sceaux; Pierre Chavel, Chilly Mazarin; Denis Joyeux, Les Ulis; Dominique Baude, Saint Ouen, all of France

[73] Assignee: Essilor International-Compagnie Generale d'Optique, Creteil, France

[21] Appl. No.: 431,489

[22] Filed: Nov. 3, 1989

[30] Foreign Application Priority Data

Nov. 9, 1988 [FR] France .................. 88 14634

[51] Int. Cl.$^5$ .............. G02C 7/04; B29D 11/00; G02B 27/42; G02B 3/08
[52] U.S. Cl. .............. 351/160 H; 264/1.7; 264/2.1; 264/2.4; 351/161; 351/177; 359/570; 359/571; 359/743
[58] Field of Search ............ 351/160 R, 160 H, 161, 351/162, 177; 350/452, 162.16, 162.22; 359/743, 558, 570, 571; 264/2.1, 1.7, 2.4

[56] References Cited

U.S. PATENT DOCUMENTS

| | | | |
|---|---|---|---|
| 4,055,378 | 10/1977 | Feneberg et al. | 351/160 R |
| 4,070,105 | 1/1978 | Marzouk | 351/159 |
| 4,146,306 | 3/1979 | Wallach | 350/452 |
| 4,310,391 | 7/1980 | Cohen | 351/161 |
| 4,338,005 | 7/1982 | Cohen | 351/161 |
| 4,340,283 | 7/1982 | Cohen | 351/161 |
| 4,417,790 | 11/1983 | Dawson et al. | 351/166 |

FOREIGN PATENT DOCUMENTS

| | | | |
|---|---|---|---|
| 109753 | 5/1984 | European Pat. Off. | 351/161 |
| 1497717 | 10/1967 | France | 351/168 |
| 1563585 | 4/1969 | France | 351/159 |

Primary Examiner—Scott J. Sugarman
Attorney, Agent, or Firm—Blakely Sokoloff Taylor & Zafman

[57] ABSTRACT

A diffractive contact lens in relief includes a smoothing layer (50) of optically transparent material having a smooth outside surface (51) and placed over the optical surface (16) in relief so as to immerse the relief.

13 Claims, 1 Drawing Sheet

STATE OF THE ART

DIFFRACTIVE CONTACT LENS IN RELIEF

The present invention relates to contact lens for placing on the cornea of the eye.

BACKGROUND OF THE INVENTION

For several years, the person skilled in the art has envisaged developing diffractive lenses (see, for example, European patent EP-A-0 064 812, U.S. Pat. No. 4,637,697, or French patent application number FR-88 06699, filed May 19, 1988).

Diffractive contact lenses in relief, as shown in accompanying FIG. 1, are generally in the form of a component 10 having two optical surfaces 14 and 16, one of which has a zoned Fresnel grating, concentric with the axis 12 of the lens and constituted by a series of annular structures $17_1$, $17_2$, $17_3$, ... in relief.

The structures $1m$ generally all have the same profile. In addition they occupy the same area. The outer radii of the various structures therefore obey a geometrical progression of the type: $\sqrt{K}$. r where r designates the outside radius of the central structure, and K designates successive integers.

The focal lengths fn of the diffractive component made in this way are given by: $fn = r^2/2n\lambda$, in which
r = the outside radius of the central structure;
n = the order of diffraction; and
$\lambda$: the wavelength under consideration.

Order of diffraction $n = +1$ may be obtained using sampled kinoform type structures in relief, i.e. structures each having a profile built up from M levels, at phase differences of $2\pi/M$, where M is greater than 2.

Orders of diffraction $n = +1$ and $n = -1$ may be obtained simultaneously with structures in relief of the square wave function type generating a phase difference of $\pi$.

The performance of a diffractive contact lens in relief and expressed in terms of diffraction efficiency depends firstly on the product: depth of relief times the difference between the indices on either side of the optical surface in relief. This product is generally called the "relief optical depth".

The relief optical depth lies generally between 1 and 1½ times the mean utilization wavelength (about 0.5 $\mu$).

In order to reduce the accuracy constraints on making the component (i.e. to increase the depth of the relief as much as possible) it quickly appears to the person skilled in the art that the optical surface in relief needs to be placed adjacent to the cornea of the eye since the index difference $n_1 - n_3$ is less than $n_1 - n_2$, where $n_1$ is the index of the material forming the component, $n_2$ is the index of air, and $n_3$ is the index of tear liquid.

Reference can usefully be made to the above-mentioned prior documents in order to obtain an understanding of the structure and the function of diffractive contact lenses.

It is observed that such lenses have not, in practice, become the subject of large-scale industrial manufacture.

This seems to be due to the fact that in spite of their theoretically attractive properties, diffractive contact lenses in relief nevertheless suffer from unacceptable drawbacks.

Firstly, since it is almost essential for the sharp-edged optical surface 16 in relief to be placed adjacent to the cornea of the eye, as described above, wearing diffractive contact lenses in relief quickly leads to irritation.

In addition, the operation of diffractive contact lenses in relief varies widely as a function of the hydration conditions of the surface in relief.

In addition, the presence of set backs on the inside face of the lenses encourages rapid deposition of proteins and fats contained in tear liquid, thereby clogging the inside faces of the lenses and reducing diffraction efficiency.

The object of the present invention is to eliminate the above-mentioned drawbacks.

SUMMARY OF THE INVENTION

To this end, the present invention provides a diffractive contact lens in relief which includes a smoothing layer of optically transparent material having a smooth outside surface and placed over the optical surface in relief so as to immerse the relief.

BRIEF DESCRIPTION OF THE DRAWING

An embodiment of the invention is described by way of example with reference to the accompanying drawing, in which.

DETAILED DESCRIPTION

Figure 2:
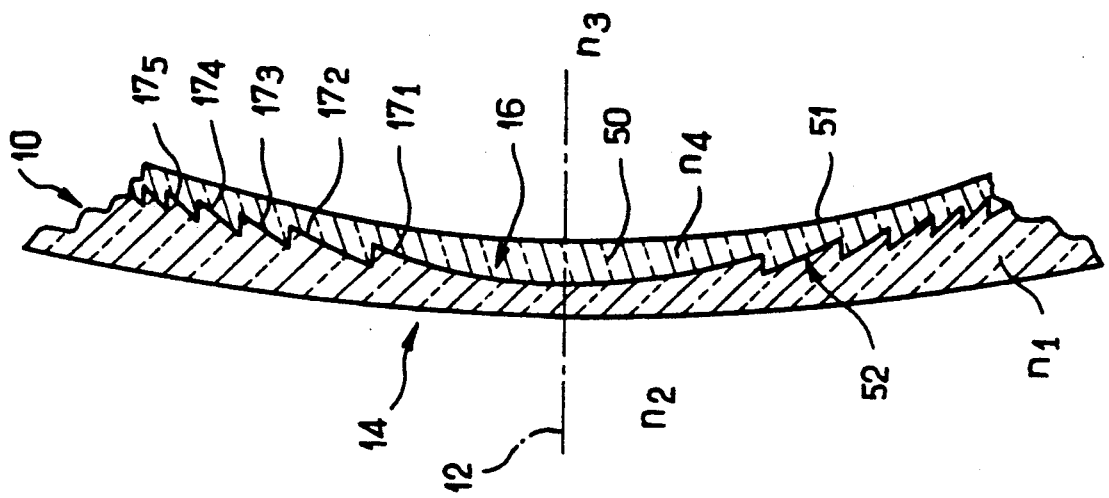
FIG. 2 is a diagrammatic axial section through a diffractive contact lens in relief of the present invention.
Figure 1:
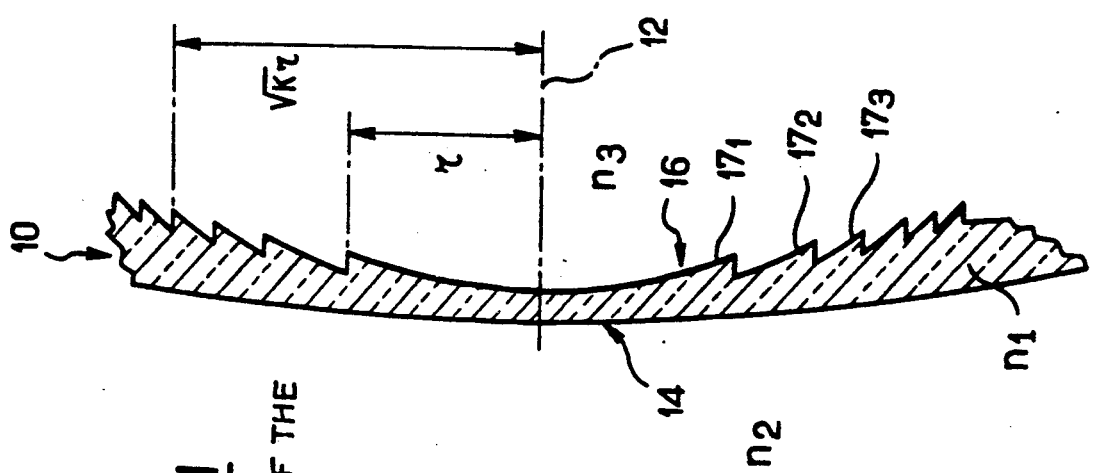
FIG. 1 is a diagrammatic axial section through a conventional diffractive contact lens in relief in accordance with the prior art.

Accompanying FIG. 2 shows a diffractive contact lens in relief in accordance with the invention and including a conventional optical component 10 delimited by two optical surfaces 14 and 16, one of which (16) is in relief.

The first optical surface 14 is smooth and convex towards the outside of the component. The surface 14 may be constituted, for example, by a portion of a spherical surface centered on a point lying on the lens axis 12.

The second optical surface 16 lies about a mean surface which is concave on the outside of the component. The mean surface 16 advantageously corresponds to a spherical surface also centered on a point lying on the lens axis 12.

The mean profiles of the optical surfaces 14 and 16 may be adapted to define a basic refractive power to which diffractive power is added as defined by the surface 16 in relief.

According to the invention, the lens shown in FIG. 2 further includes a smoothing layer 50 of optically transparent material placed against the surface 16 in relief in order to immerse the relief.

The surface 52 of the layer 50 in contact with the surface 16 in relief is thus complementary to the relief provided in the component 10.

The second surface 51 of the layer 50, on the outside of the lens, is smooth and complementary to the outside surface of the cornea of the eye.

The layer 50 is made of a material which is suitable for being easily wetted by tears, thereby avoiding any air being present in the interface between the layer 50 and tear liquid.

In addition, according to an advantageous feature of the invention, the material constituting the layer 50 is hydrophilic. This property means that tear liquid is capable of filling any voids that may be left during manufacture between the optical surface in relief and the layer 50.

According to another feature of the invention, the material constituting the layer 50 has a refractive index $n_4$ which is greater than the refractive index $n_3$ of tear liquid. Thus, since the resulting index difference $n_1-n_4$ is less than the index difference $n_1-n_3$ which would obtain in the absence of the layer 50, the invention increases physical depth of relief required for obtaining the same relief optical depth.

However, it is preferable for the index of the material constituting the layer 50 to be close to the refractive index of tear liquid. Thus, assuming that tear liquid occupies any voids that may be present in the layer 50 or at the interface between the optical surface in relief and the layer 50, then the layer 50 applied to the optical surface 16 in relief nevertheless behaves like a substantially uniform component.

By way of non-limiting example, the base component 10 of index $n_1$ may be made of polymethyl methacrylate or of a silicone acrylate copolymer. The layer 50 applied thereto in accordance with the invention is advantageously made of gelatin, colagen, or, for example, copolymers obtained from methyl methacrylate and n-vinyl pyrolidone, with such materials being described respectively in the following patents: EP-0 011 523, FR-A 586 703, and FR-2 370 063.

The layer 50 may be deposited on the surface 16 in relief by conventional overmolding. In a variant, the layer 50 may be deposited on the optical surface 16 in relief using the conventional technique known to the person skilled in the art consisting in placing the lens substantially horizontally, i.e. with its axis vertical and its optical surface in relief facing upwards, in placing a drop of the material that is to constitute the layer 50 on the top surface of the lens, and then in centrifuging the assembly.

The present invention presents the following advantages, in particular.

The cornea of the eye is protected by the layer 50 from the sharp edges of the optical surface in relief. The lens is therefore tolerated better.

The outside surface 51 of the layer 50 may be more easily fitted to the surface of the cornea of the eye than the optical surface in relief.

By having the layer 50 permanently in contact with the optical surface in relief, the index difference at the optical surface interface is stabilized relative to a temporary lack of hydration.

Similarly, when the material of the layer 50 is hyrophilic, tear liquid may "perfuse" through the material, thereby filling any possible voids in the material, in particular at the interface between the surface 16 in relief and the layer 50. As a result, the layer 50 appears to be substantially uniform from the optical point of view, providing the refractive index of the material is fairly close to the refractive index of tear liquid.

Since the index difference $n_1-n_4$ is less than the index difference $n_1-n_2$, the accuracy required of the relief is less than would be the case if the optical surface in relief were in contact with air. In addition, since the index difference $n_1-n_4$ is also less than the index difference $n_1-n_3$ when the index $n_4$ of the layer 50 is greater than the index of tear liquid, it is also possible to relax the accuracy required of the relief to less than that required for conventional lenses having the optical surface in relief in contact with the cornea of the eye.

For example, when the material constituting the base component 10 is polymethyl methacrylate, its index $n_1=1.49$.

The required depth of relief is of the order of: $0.5/(1.49-1)$ i.e. about $1\mu$ when the surface in relief is in contact with air.

It is recalled that the depth of the relief is equal to the ratio between the relief optical depth (lying between 1 and $1\frac{1}{2}$ times the mean wavelength) and the difference in index on opposite sides of the optical surface in relief.

The required depth of relief is of the order of: $0.5/(1.49-1.34)=3.33\mu$ when the surface in relief is immersed in tear liquid.

Finally, the required depth of the relief is of the order of: $0.5/(1.49-1.378)=4.46\mu$ when the surface in relief is covered with a layer of hydrated gelatin in accordance with the present invention.

The accuracy advantage obtained using the present invention is thus a factor of 4.5 over the non-immersed case, whereas the corresponding advantage is only 3.3 for a lens immersed in tear liquid.

It should also be observed that the outside face 14 of the lens of the invention shown in FIG. 2 remains available to be formed with arbitrary curvature, or with a plurality of different curvatures, depending on the desired correction.

Naturally, the present invention is not limited to the particular embodiment described above, but extends to any variant coming within the scope of the claims.

We claim:

1. A diffractive contact lens comprising an optical component delimited by a first optical surface which is smooth and convex and by a second optical surface which is generally concave and provided with diffractive reliefs, said second concave optical surface being intended to be placed on the side of the cornea of the eye and further comprising a smoothing layer of optically transparent material having a smooth outside surface and placed over the second optical surface in relief of said optical component so as to immerse the diffractive reliefs, wherein the material forming the smoothing layer is different from the material forming the optical component and is wettable by tear liquid and the refractive index $n_4$ of the material forming the smoothing layer is greater than the index $n_3$ of tear liquid, while being lower than the index $n_1$ of the optical component.

2. A diffractive contact lens in relief according to claim 1, wherein the material forming the smoothing layer is hydrophilic.

3. A diffractive contact lens in relief according to claim 1, wherein the smoothing layer is based on gelatin or colagen.

4. A diffractive contact lens in relief according to claim 1, wherein the smoothing layer is based on copolymers obtained from methyl methacrylate and n-vinyl pryolidone.

5. A diffractive contact lens in relief according to claim 1, wherein the smoothing layer is formed by overmolding onto the optical surface in relief.

6. A diffractive contact lens in relief according to claim 1, wherein the refractive index of the material constituting the smoothing layer is about 1.378.

7. A diffractive contact lens comprising an optical component delimited by a first optical surface which is smooth and convex and by a second optical surface which is generally concave and provided with diffractive reliefs, said second optical surface being intended to be placed on the side of the cornea of the eye, and further comprising a smoothing layer of optically transparent material having a smooth outside surface and placed over the second optical surface in relief so as to immerse the relief, wherein the smoothing layer is made by placing the lens axis vertical with its optical surface in relief facing upwards, by depositing a drop of material suitable for constituting the smoothing layer on the optical surface in relief, and then by centrifuging the assembly.

8. A diffractive contact lens in relief according to claim 7, wherein the material forming the smoothing layer is wettable by tear liquid.

9. A diffractive contact lens in relief according to claim 7, wherein the material forming the smoothing layer is hydrophilic.

10. A diffractive contact lens in relief according to claim 7, wherein the refractive index $n_4$ of the material forming the smoothing layer is greater than the index $n_3$ of the tear liquid.

11. A diffractive contact lens in relief according to claim 7, wherein the smoothing layer is based on gelatin or colagen.

12. A diffractive contact lens in relief according to claim 7, wherein the smoothing layer is based on co-polymers obtained from methyl methacrylate and n-vinyl pryolidone.

13. A diffractive contact lens in relief according to claim 7, wherein the refractive index of the material constituting the smoothing about 1.378.

* * * * *